(No Model.) 6 Sheets—Sheet 1.

T. A. EMMONS.
MACHINE FOR MAKING LOOM HARNESS.

No. 383,716. Patented May 29, 1888.

Fig. 1.

Witnesses.
Fred L. Emery.
Howard F. Eaton.

Inventor.
Thomas A. Emmons
by Lemby & Gregory
Attys.

(No Model.) 6 Sheets—Sheet 2.

T. A. EMMONS.
MACHINE FOR MAKING LOOM HARNESS.

No. 383,716. Patented May 29, 1888.

Witnesses:
Fred L. Emery.
Howard F. Eaton.

Inventor.
Thomas A. Emmons
by Crosby & Gregory
attys.

(No Model.)  6 Sheets—Sheet 3.

T. A. EMMONS.
MACHINE FOR MAKING LOOM HARNESS.

No. 383,716. Patented May 29, 1888.

Fig. 3.

Witnesses.
Fred L. Emery.
Howard F. Eaton.

Inventor.
Thomas A. Emmons.
by Crosby Gregory
attys.

(No Model.) 6 Sheets—Sheet 4.
T. A. EMMONS.
MACHINE FOR MAKING LOOM HARNESS.
No. 383,716. Patented May 29, 1888.

Witnesses.
Howard F. Eaton
Fred L. Emery

Inventor.
Thomas A. Emmons
by Crosby & Gregory
attys (No Model.) 6 Sheets—Sheet 5.
T. A. EMMONS.
MACHINE FOR MAKING LOOM HARNESS.
No. 383,716. Patented May 29, 1888.

Witnesses.
Fred L. Emery.
Howard F. Eaton.

Inventor.
Thomas A. Emmons.
by Crosby & Gregory
atty's.

UNITED STATES PATENT OFFICE.

THOMAS A. EMMONS, OF LAWRENCE, MASSACHUSETTS.

MACHINE FOR MAKING LOOM-HARNESS.

SPECIFICATION forming part of Letters Patent No. 383,716, dated May 29, 1888.

Application filed June 23, 1887. Serial No. 242,250. (No model.)

*To all whom it may concern:*

Be it known that I, THOMAS A. EMMONS, of Lawrence, county of Essex, and State of Massachusetts, have invented an Improvement in Machines for Making Loom-Harness, of which the following description, in connection with the accompanying drawings, is a specification, like letters on the drawings representing like parts.

This invention has for its object to provide a machine for the manufacture of loom-harness wherein the two sets of heddles connected with one set of back-bands will present their eyes at different distances between the back-bands or out of line with each other, in order that the warp-threads, when the shed is closed, will occupy slightly different planes, thereby greatly lessening and substantially preventing the friction of adjacent warps against each other.

The machine herein to be described is an improvement upon that described in United States Letters Patent No. 80,774, dated August 4, 1868, and No. 148,252, dated March 3, 1874, the two machines containing many like parts, the chief essential difference between the machine herein to be described and that described in the patent referred to being in the peculiar and novel combination and arrangement of the eye-formers, the needles, and the eye dischargers, whereby it is possible to make the eyes of adjacent heddles at different distances from the center line between the parallel back-bands.

The frame-work A, of suitable shape to sustain the working parts, has a main shaft, A', which may be driven from any suitable power, the said shaft in practice being provided with suitable belt-pulleys. (Not shown.)

Figure 3:
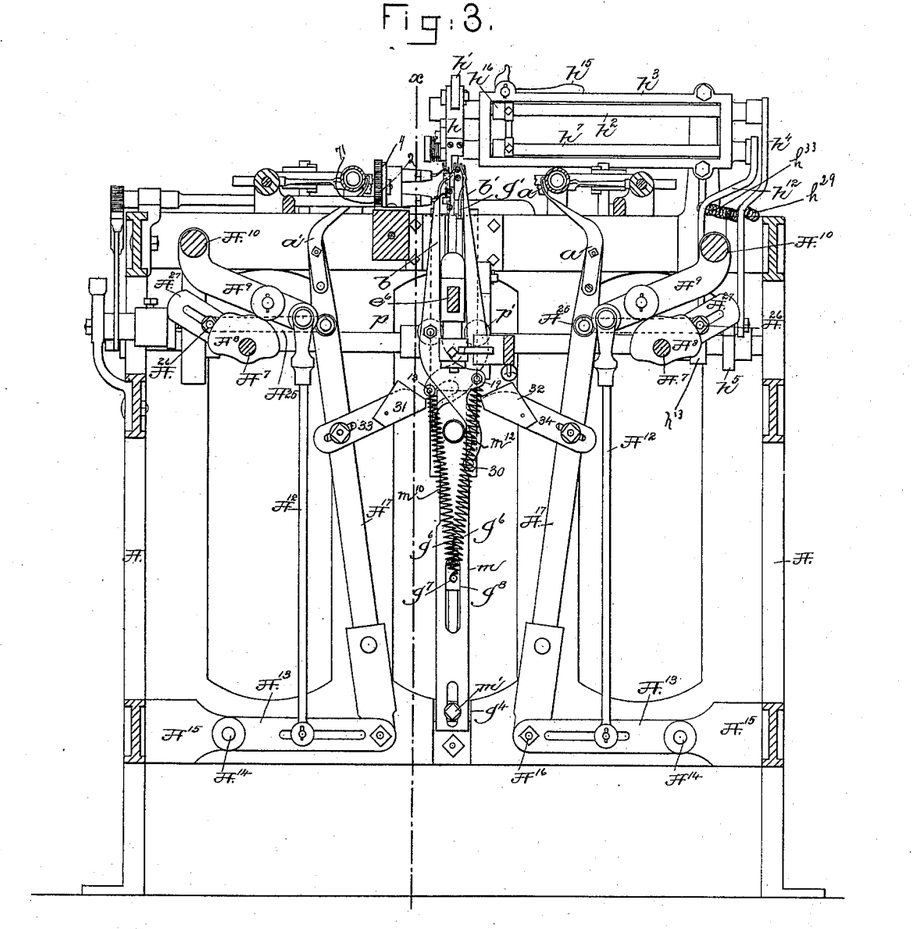
Fig. 3 is a cross section in the line $x'$, Fig. 1, looking toward the rear of the machine.

The shaft A' has a pinion, $A^2$, which engages a toothed gear, $A^3$, fast on a parallel shaft, $A^4$, extended across the machine, the said shaft having two like beveled gears, $A^5$, which engage like beveled gears, $A^6$, secured to short shafts $A^7$, extended longitudinally of the machine, the said shafts having upon them like cams, $A^8$, (see Fig. 3,) which act upon friction-rolls of the radius-bars $A^9$, mounted loosely on studs $A^{10}$, the said radius-bars being adjustably joined by connecting-rods $A^{12}$ to levers $A^{13}$, pivoted at $A^{14}$ on stands $A^{15}$, properly bolted to the frame, the said levers $A^{13}$ having pivoted upon them arms $A^{17}$, provided at their upper end with what I shall call the "loop drawing hooks," (marked $a\,a$,) the said hooks being common to United States Patent No. 80,774.

Figure 1:
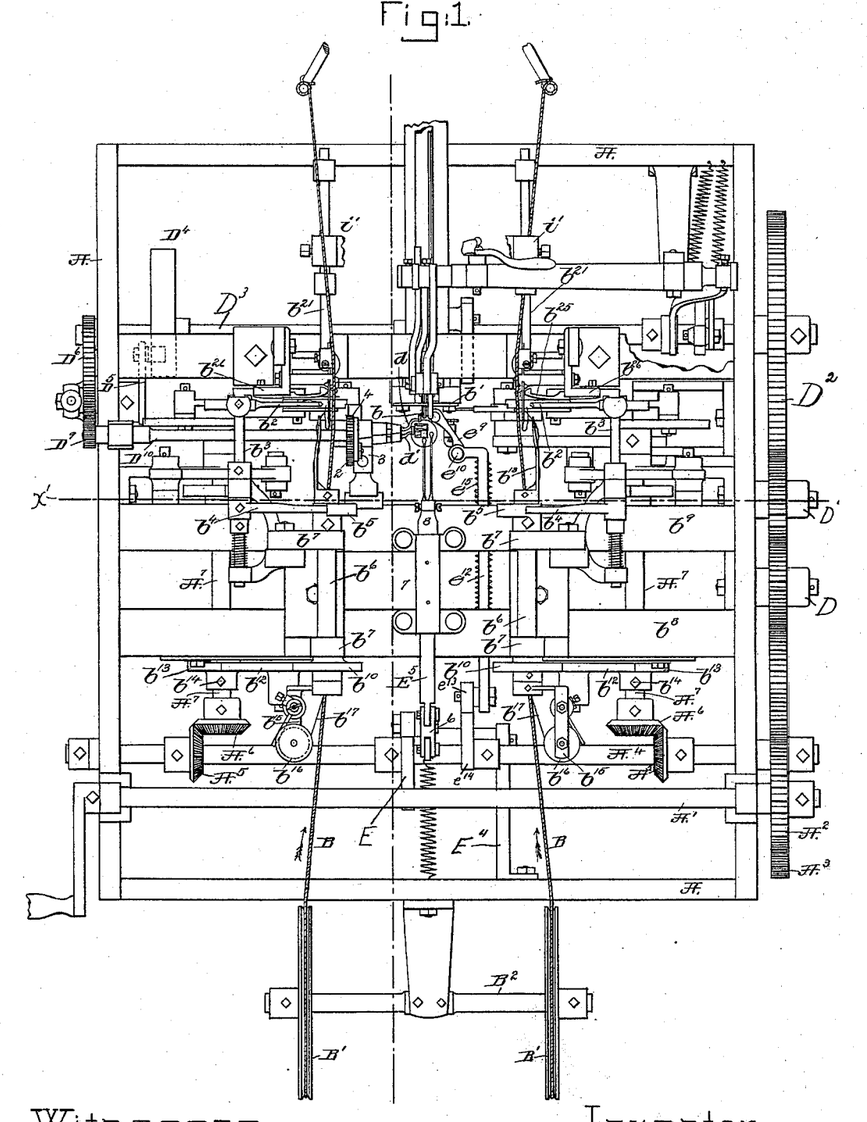
Figure 1 of the drawings represents a top or plan view of a portion of a machine for making loom-harness, which, taken in connection with the patents referred to, will be sufficient to enable one to understand my invention.
Figures 11, 12, 13:
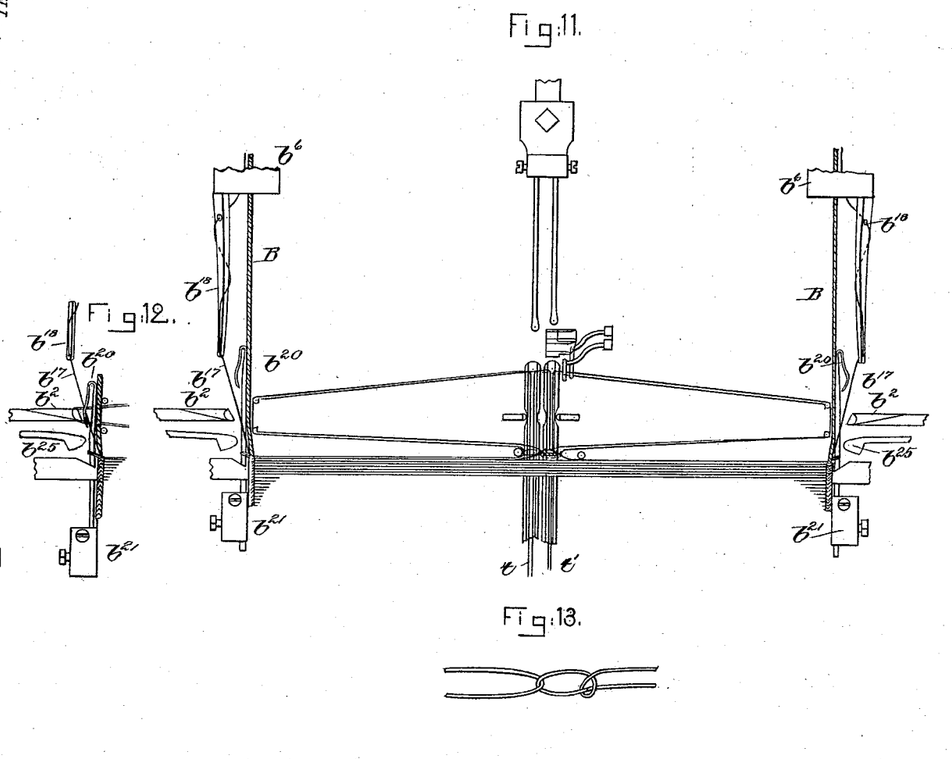
Fig. 11 is an enlarged detail of the parts shown in Fig. 6, together with the head-bands and devices employed to carry the heddle-threads to the head-bands and knit them to the head-bands.
Fig. 12 is an enlarged detail showing the knitting-needle as taking a loop of knitting-thread through the loop of heddle-thread, the knitting-thread being wrapped about the head-band by a knitting thread-carrier.
Fig. 13 shows the shape of the eye made in the heddle.

The threads $t\,t'$, from which the heddles are to be made, are taken from suitable spools or bobbins at the rear end of the machine, (not shown,) and, being subjected to tension in any usual manner, are led forward through the long central grooves of two needles, C C', thence out from opposite sides of the said needles through eyes at or near their points, there being two such threads for each needle, as in the said patent. The needles C C', at their outer sides a short distance back from their eyes, have concavities to better enable certain loop-taking fingers, $b$ $b'$, to be described, to rise between the said needles and their threads $t'$ $t$, the said threads after leaving the eyes of the needle passing back to the heddle-eyes already formed, we will suppose, upon the needles. Herein the said hooks $a$ $a$, already mentioned, operate just as they do in the machine described in the said patent—i. e., they take the loops of thread from the loop-taking fingers $b$ $b'$, and carry the said loops outward and deposit them upon like loop-holding hooks, $b^2$, connected with rock-shafts $b^3$, having arms $b^4$, operated by cams $b^5$, fast upon the rotating hollow shafts $b^6$, held in bearings $b^7$ of the stands secured to the cross-girths $b^8$ $b^9$. The hollow shafts $b^6$ have attached to them pinions $b^{10}$, which are engaged and rotated by intermediate gears, $b^{12}$, deriving their motion from pinions $b^{13}$, the hubs of which are fastened by set-screws $b^{14}$ to the shafts $A^7$, before described. Each hollow shaft $b^6$ receives through it one of the head-bands B, the said head-bands coming from suitable spools located, preferably, at the rear of the machine and passing under and then over guide sheaves B', mounted loosely on a suitable axle or stud, $B^2$, the said head-bands passing from the top of the said sheaves through the hollow shafts $b^6$ in the direction of the arrows marked near the head-bands in Fig. 1. Each hollow shaft $b^6$ has secured to it a bracket, $b^{15}$, in which is mounted a spool, $b^{16}$, carrying the binder or knitting thread $b^{17}$, the said thread being extended through the hollow shaft and through suitable eyes of the binder or knitting thread carrier $b^{18}$, attached to the inner end of the rotating shaft $b^6$, so that in the rotation of the said shaft the binder or knitting thread is caused to travel in a circular path about the head-band, the said carrier at each rotation of the shaft $b^6$ lapping its thread about the shank of a needle, $b^{20}$, carried by a longitudinal reciprocating needle-operating rod, $b^{21}$, the binder or knitting thread being wrapped around the shank of the said needle beyond the inner end of its spring, beard, or latch while the needle is in its forward position, as in Fig. 11, in order that the said needle, when moved backward toward the rear of the machine, will catch the binder-thread, as in Fig. 12, and also the loop of heddle-thread then held on one of the loop-holding hooks $b^2$, and draw the same through a loop of its own thread then on the shank of the said needle.

In operation the parts are so timed that the needles do not start to move backward until just about as, or immediately after the loop-drawing hooks $a$ have discharged their loops upon the loop-holding hooks $b^2$, and thereafter the hooks $b^2$ rise in such time and with such relation to the position of the needles $b^2$ that the beards or hooks of the said needles not only pass over the binder or knitting threads, but also enter the loops of heddle-yarns held on the hooks $b^2$, the needles taking the said loops of heddle-yarn from the said hooks, the latter decending. In the backward movement of the needles they act to draw or enchain the binder or knitting threads and the loops drawn out by the loop-drawing hooks $a$, as described, through a loop of the binder-thread then on the shank of each bearded needle, the binder or knitting threads so manipulated "knitting," as it is called, the heddles upon the head-bands. The needles have co-operating with them suitable pressers, as $b^{25}$, suitably attached to stands $b^{26}$. The needle-carrying rods $b^{21}$ at opposite sides the center of the machine are connected by a cross-bar, $i'$, partially broken out in Fig. 1, the said cross-bar being fully shown in Patent No. 80,774; but the operating devices for the said cross-bar or the devices for actuating it so as to reciprocate in unison the two needle carrying bars is omitted in the present drawings, because in practice the said device will be as in the said patent.

The mechanism so far described is substantially such as described in Patent No. 80,774 referred to, it differing but slightly in form, and no claim is laid to such devices.

Figure 4:
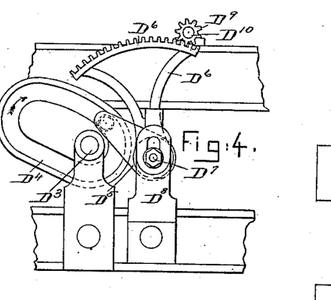
Fig. 4 is a detail from the left of Fig. 3, showing the devices for operating the thread-twisters.
Figure 5:
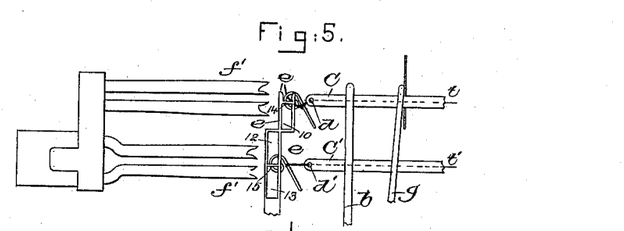
Fig. 5 is a detail showing the needles, eye-formers, thread-twisters, eye dischargers, and other parts to be described in the position occupied by them as the twisters are about to start to wind the heddle-threads carried by the needles about the eye-former.
Figure 6:
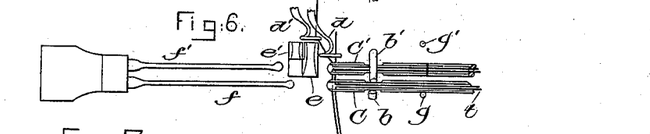
Fig. 6 is a top view of Fig. 5.

The levers $A^{17}$, carrying the loop-drawing hooks $a$, besides rising and falling, have also a movement toward and from the needles C C', to be described, in order that the loops taken by the said loop-drawing hooks may be deposited, as described, upon the loop-holding hooks $b^2$. The levers $A^{17}$ derive their lateral movement from links $A^{25}$, pivoted to them and adjustably connected by studs $A^{26}$ in arms $A^{27}$, fast upon shafts $A^7$, before described, just beyond the cams $A^8$. The gear $A^3$, (see Fig. 2,) through suitable intermediates, D D', rotates a toothed gear, $D^2$, fast on a shaft, $D^3$, extended across the frame-work, the said shaft, near its opposite end, (see Fig. 1,) having a face-cam, $D^4$, which receives in it a roller or other stud (shown by dotted lines) of an arm, $D^5$, secured to the hub of a sector, $D^6$, (shown best in Figs. 1 and 4,) the hub of the said sector being mounted loosely upon a stud, $D^7$, of a stand, $D^8$. This sector engages a pinion, $D^9$, on a shaft, $D^{10}$, provided at its inner end with one, $d'$, of the heddle-thread twisters $d$ $d'$, the said shaft having a small toothed pinion, $7'$, which engages an intermediate, 2, mounted loosely on a stud held in a small bracket, 3, (see Fig. 1,) secured to the cross-girth $b^9$, the said bracket being preferably made in several pieces connected together by bolts or screws, in order to provide for adjustment. The intermediate 2 referred to engages a small toothed pinion, 4, on a short shaft carrying the second or upper twister, $d$, of the heddle-thread twisters $d$ $d'$, the said heddle-thread twisters (shown on a larger scale in Figs. 5 to 9,) being arranged in different vertical planes, and, as herein shown, the uppermost twister, $d$, is extended farther toward the center of the machine than the twister $d'$, such construction being necessary in order that the said twisters may correctly wind the loops of heddle-thread drawn out from the needles C C' about the eye-formers $e$ $e'$, with which operate, respectively, the loop-twisters $d$ $d'$. In operation the twisters $d$ $d'$ take the loops of heddle-thread extended between the eyes of the two needles C C' and the loop-drawing hooks $a$, as in Fig. 11, the said twisters, the eye-formers being in the position shown in Fig. 11, being actuated to wind the said heddle-threads $t$ $t'$ once around the said eye-formers, after which the latter are rotated for about ninety degrees, or from the position of Fig. 6 to that of Fig. 8, thus leaving the eye-formers in line with the needles C C' and with the eye-dischargers $f f'$, to be described. When the eye-formers, with the heddle-threads wrapped about them, are turned from the position of Fig. 6 to the position of Fig. 8, the loop-twisters are immediately reversed into their normal or starting position to release them from or to back out of the loops of heddle-thread on the eye-formers.

The eye-formers $e$ $e'$ are connected with and form part of a shank, $e^2$, attached to a rock-shaft, $e^3$, extended through a bearing or sleeve, $e^4$, the rock-shaft being prevented from dropping down by means of a head or shoulder, as $e^5$. The eye-formers (see Figs. 6 and 7) are located in different horizontal and also different vertical planes, the latter location, or the location of one eye-former at one side of the other one, being of my invention, and being a prime necessity in the manufacture of loom-harness embodying my invention, or loom-harness in which the eyes are at different distances from the head-bands. The bearing $e^4$ forms part of a bar or bracket, $e^6$, extended through hangers $e^7$, attached to the cross-bars $b^8$ $b^9$, the said hangers having suitable set-screws, as $e^8$, by which to confine the bracket $e^6$ in adjustable position. The lower end of the shaft $e^3$ has attached to it a suitable crank or arm, which, by a link, $e^9$, (see Fig. 1,) is jointed, as at $e^{10}$, to the inner end of a slide-bar, $e^{12}$, provided at its rear end with a roll, as $e^{13}$, which is acted upon by a suitable cam, as $e^{14}$, attached to the shaft A⁴, the bar $e^{12}$ being acted upon by a spiral spring, as $e^{15}$, (shown in Fig. 1,) the said spring normally keeping the roll $e^{13}$ pressed toward the shaft A⁴. The shaft A⁴ has upon it a cam, E, which acts upon a roller or other stud, E', carried by a lever, E², having its fulcrum at E³, a spring, E⁴, normally keeping the roller E' pressed toward the cam E.

Figures 7, 8, 9, 10:
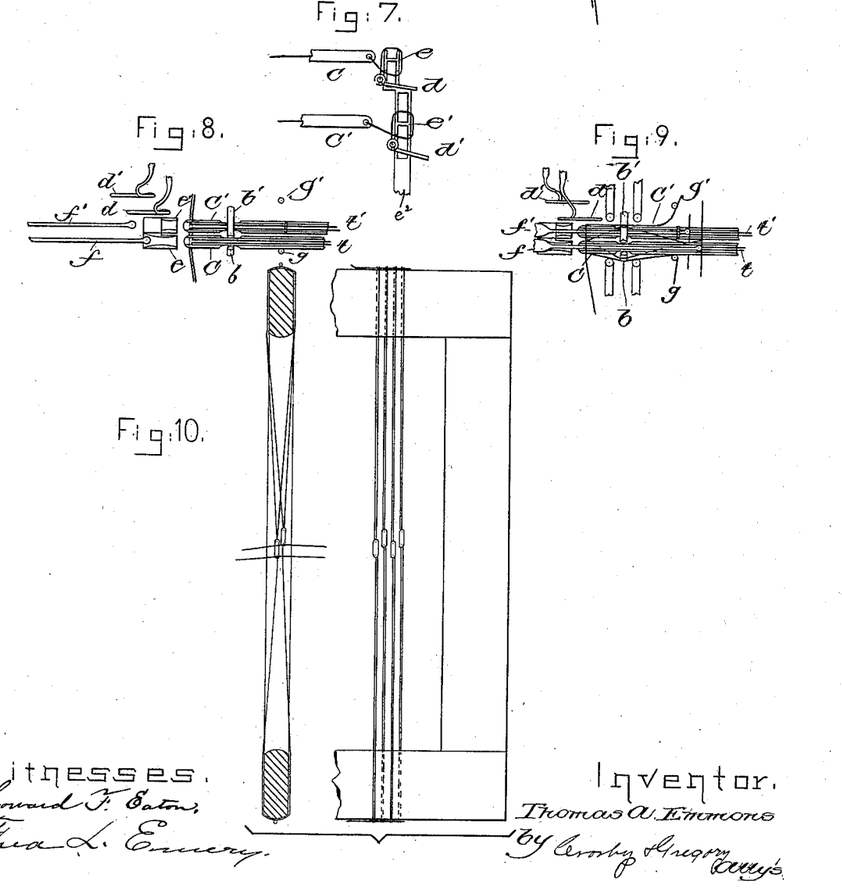
Fig. 7 shows the needles and eye-formers and ends of the twisters, the heddle-threads being wrapped about the eye-formers preparatory to the quarter-oscillation of the eye-formers.
Fig. 8 is a top or plan view the same as Fig. 6, but showing the eye-formers turned a quarter-turn.
Fig. 9 is the same as Fig. 8, with the eye-dischargers pushed forward to remove the eyes from the eye-formers.
Fig. 10 shows two views of parts of a heddle-frame having heddles with eyes located with relation to each other and the head-bands as the same will be left by the machine herein to be described.

The upper end of the lever E² has jointed to it a small link, 6, (see Fig. 2,) which in turn is jointed to a rod, E⁵, extended through suitable bearings, 7, and having attached to its inner end a hub, 8, which in turn has secured to it the eye-dischargers $f f'$, (shown on a large scale in Fig. 5,) the said dischargers being composed each of two forked blades, and adapted when the eye-formers are in the position shown in Fig. 8 to move forward through the slots or spaces, as 10 12 13, (see Fig. 5,) on the eye-formers, the forked portions of the eye-dischargers engaging the loops of heddle-threads wound around the eye-formers, as shown in detail, Fig. 7, at a point both above and below the horizontal projections, as 14 15, of the eye-formers, the notches of the eye-dischargers engaging the upper and lower bights of the heddle threads wrapped about the eye-formers and pushing them from the eye-formers directly upon the needles C C', the forked parts of the eye-dischargers passing the eyes so formed upon the ends of the said needles and pushing them back thereon far enough to be engaged by the eye retainers $g$ $g'$ $g^2$. The eye-retainers $g$ $g'$ are attached to the upper end of an elbow-lever, 16, (see Fig. 2,) having its fulcrum on a pin, 17, held by suitable lugs attached to a frame, $g^3$, sliding vertically in bearings $g^4$ $g^5$. The frame $g^3$ has attached to it a collar, $g^8$, having a stud to which are attached two spiral springs, $g^6$, the said springs having their upper ends connected, respectively, to studs 18 19. This frame $g^3$ has extended from its rear side an ear, $g^\times$, provided with a stud, 20, upon which is loosely mounted a roll, 21, the said roll resting normally upon a cam, 22, secured to the shaft D³, the weight of the frame $g^3$ and its attached parts, or the gravity of the frame, serving to keep the roll 21 in contact with the said cam.

Figure 2:
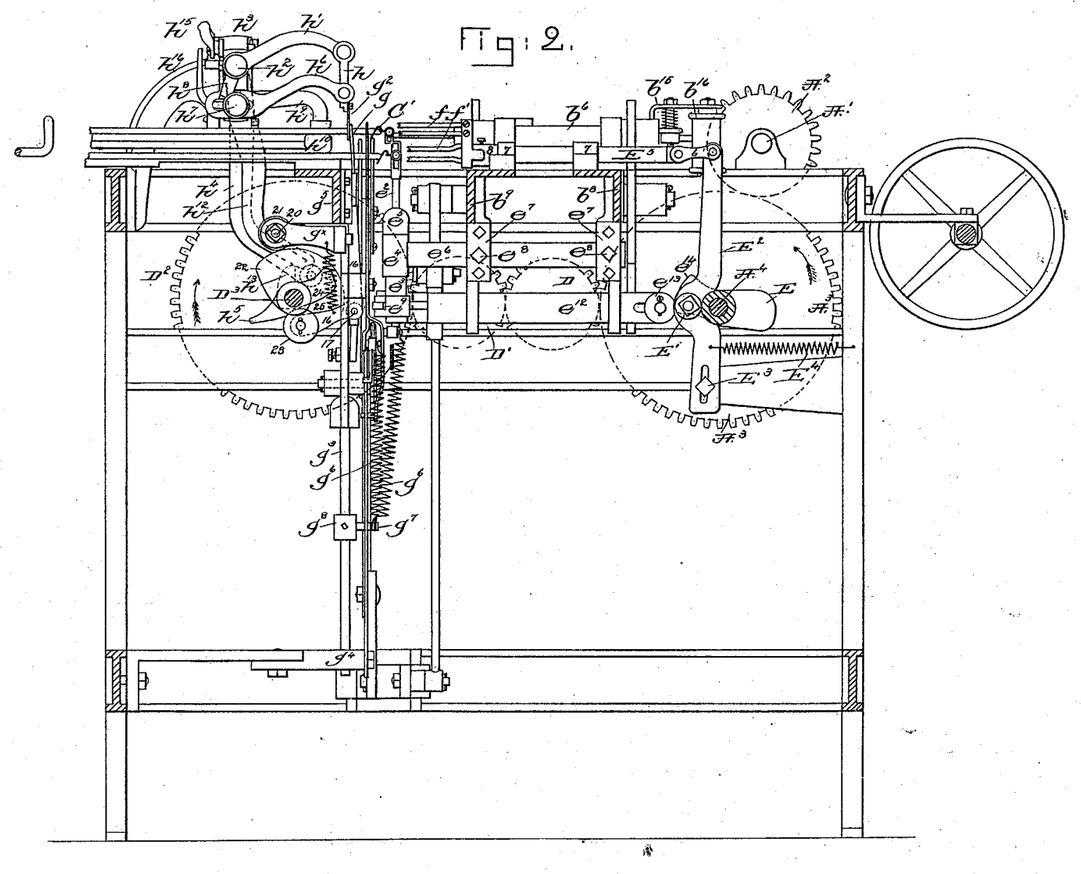
Fig. 2 is a longitudinal section in the line $x$, Fig. 3.

The short arm of the elbow-lever 16 is provided with a stud, upon which is placed an anti-friction roll, 23, which in the rotation of the shaft D³ is struck by a cam, 24, attached to the said shaft, the said cam when in contact with the roll 23 serving to hold the loop-retainers $g$ $g'$ in their most backward position, or to the left in Fig. 2, the frame $g^3$ at such time descending, the retainer also at such time being moved down away from behind a completed set of eyes ready to be raised in front of a set of eyes next to be pushed back upon the needles by the eye-dischargers. The short arm of the elbow-lever 16 is connected by a spring, 25, with the lug $g^\times$, so that as soon as the cam 24 leaves the roll 23, the frame $g^3$ and the loop-retainers $g$ $g'$ being in their lowest position, the said spring normally acts to turn the elbow-lever, carrying the loop-retainers $g$ $g'$ forward, or to the right in Fig. 2, so that by the time that the cam 22 in its rotation, acting on the roll 21, commences to lift the frame $g^3$ the loop-retainers $g$ $g'$ start upward from below the undermost needle, C', just about as the eye-dischargers $f f'$ complete their farthest inward movement toward the rear of the machine, and at the same time the loop-retainer $g^2$ descends quickly behind the uppermost heddle, and thereafter the loop-retainers $g$ $g'$ continue to rise until they pass above the heddle-threads extended from the uppermost needle, C, at which time, as the frame $g^3$ rises into its most elevated position, the roll 23, before described, by striking against the hub of the cam 24, causes the elbow-lever 16 to be sprung backward, or toward the left in Fig. 2, the loop-retainers $g$ $g'$ at such time pushing the two heddle-eyes backward upon the needles, the loop dischargers at such time being started backward toward the front of the machine, the said loop-retainers $g$ $g'$ $g^2$ remaining in position to hold the heddles just formed in place, while the loop-taking fingers $b$ $b'$, to be described, rise vertically by the sides of the needles C C' and enter the loops of heddle-thread outside of the said needles and extended from the heddles last formed through the eyes of the needles and back through the interior of the needles to the spools holding the heddle-threads. These loop-taking fingers as they rise through the loops of heddle-thread carried by the needles C C' are moved outwardly away from the said needles to elongate the loops of heddle-threads and make spaces for the entrance of the loop-drawing hooks $a$ $a$, which rise into the extended loops held by the loop-taking fingers, the hooks $a$ entering the loops held by the loop-taking fingers and carrying them to the loop-holding hooks $b^2$ $b^2$, which rise to receive them. The loop-drawing hooks $a$, as they travel outward, pull from the needles loops of heddle-thread of sufficient length to form heddles of the proper length, and the loops carried by the loop drawing hooks $a$ $a$ having been deposited upon the loop-holding hooks $b^2$, and the eyes last formed having been fully tightened or set about the needles C C', the loop-retainers $g$ $g'$ descend below the heddles just formed on the said needles, and just about as the eye-dischargers again commence to push the loops of thread from the eye-formers the loop-retainer $g^2$ is lifted quickly from in front of the last heddle on the needle C.

The loop-retainer $g^2$ is attached to the lower end of a finger, $h$, jointed to an arm, $h'$, secured to a rock-shaft, $h^2$, having bearings in a suitable bracket, $h^3$, the said rock-shaft at its outer end being provided with an arm, $h^4$, having a suitable roller or other stud, which is acted upon by a cam, $h^5$, fast on the shaft $D^3$, a suitable spring, 229, keeping the roll of the said arm in contact with the said cam. The cam $h^5$ referred to effects the vertical movement of the loop-retainer $g^2$. This loop-retainer $g^2$ descends outside of the heddle-eyes, which are discharged from the eye formers upon the needles, and then the said loop-retainer is given a horizontal or backward movement toward the rear of the machine, as described of the loop retainers $g$ $g'$. To effect this movement, the finger $h$ has jointed to it a link, $h^6$, (see Fig. 2,) slotted at its rear to embrace loosely the end of a rock-shaft, $h^7$, parallel to the rock-shaft $h^2$, the said arm $h^6$ being notched and receiving within it a toe, $h^8$, extended backward from the rock-shaft $h^2$, so that as the loop-retainer $g^2$ descends the toe $h^8$, acting upon the link $h^6$, causes the loop-retainer $g^2$ to be moved backward. The rock-shaft $h^7$ has connected to it a presser-foot, $h^9$, which acts upon the heddles as they are pushed back upon the needles and clamps them there in position, an auxiliary clamping-block, $h^{10}$, being located between the two needles C C', the auxiliary clamping-block passing upon the under side of the heddle of the uppermost needle, C, and upon the upper side of the heddle of the lowermost needle, C'. The rock-shaft $h^7$, at its outer end, has an arm, $h^{12}$, the lower end of which is acted upon by a cam, $h^{13}$, (shown in dotted lines, Fig. 2,) when the rock-shaft $h^7$ is to be turned, which is done whenever the heddles are to be fed backward upon the needles by the head-bands, for it is obvious that the heddles must move freely over the needles toward the rear of the machine when the head-bands are moved or fed along with the heddles attached to them.

I have provided the bracket $h^3$ with a lever, $h^{15}$, which, acting upon an arm, $h^{16}$, extended from the rock-shaft $h^2$, enables the operator to lift the retainer $g^2$ whenever desired.

The loop-retainer $g'$ is bent or curved to one side (see Fig. 3) much more than the loop-retainer $g$, the greater curvature being necessary because the uppermost needle, C, is in a different vertical plane from the lowermost needle, C', the rather abrupt bend permitting the loop-retainer $g'$ to rise with its point above the uppermost needle without coming in contact with the lowermost needle. The loop-taking fingers $b$ $b'$ have their fulcra upon studs $p$ $p'$, extended through suitable ears or hubs of the sliding frame $g^3$. The short arm of the loop-taking finger $b'$ carries a stud, 18, while the short arm of the loop-taking finger $b$ carries the stud 19, before referred to. The springs $g^6$ are so connected to studs 18 19 of the loop-taking fingers $b$ $b'$ that the said springs normally act to keep the upper ends of the loop-taking fingers pressed toward each other and toward the needles, the limit of their inward motion, or the motion toward the needles of the said fingers, being determined in case of the finger $b'$ by the rear end of the stud 18, and in case of the finger $b$ by a stud, 30, secured to the lower end of the lever, (see Fig. 3,) the said studs 18 and 30 coming against the cam-shaped guide-rod $m$; attached by bolt $m'$ in adjustable manner to the bearing $g^4$ for the slide-frame $g^3$.

Figs. 1, 2, 3, and 11, the latter on a larger scale, show the position of the various parts just as the twisters take hold of the threads issuing from the needles C C' preparatory to winding them about the eye-formers. In this position the loop-taking fingers $b$ $b'$ are in their most elevated position. The fingers $b$ $b'$ commence to descend just as the twisters pass the threads held by them underneath the eye-formers, the points of the fingers descending below the lowermost needle, C', just before the eye-formers arrive in position parallel with the needles, in order to have the eyes formed on them discharged upon the needles. The eye-dischargers pass forward, take the eyes from the eye-formers, pass them back along the shanks of the needles to a point beyond the concavities at the sides thereof, (see Figs. 8 and 9,) and immediately thereafter the slide-frame $g^3$ is lifted, as described, causing the fingers $b\ b'$ to enter between the threads $t'\ t$ and the shanks of the needles, the studs 18 and 30 during the rise of the slide-frame $g^3$ passing upward over the cam-surfaces $m^{10}\ m^{12}$, respectively, of the cam-bar $m$, (see Fig. 3,) the said studs being held against the said cam-surfaces by the springs $g^6$. These cam-surfaces $m^{10}\ m^{12}$ are so shaped that the said fingers, after entering the the loops of heddle-thread at each side of the lowermost needle, have their upper ends carried bodily to the right, in order that the points of the fingers, as the sliding frame continues to rise, will enter the loops of heddle-thread carried by the uppermost needle, the said needle being located in a different vertical plane, as is necessary in order that the eye made upon it may be at a different distance from the head-bands than the eyes in the heddles upon the lowermost needle. By the time that the fingers $b\ b'$ rise far enough for their points to enter between the heddle-threads $t'\ t$ and the sides of the uppermost needle, C, the loop drawing hooks $a\ a$ lie close to the sides of the lowermost needle, both, however, below the lowermost heddle-thread. In this condition the finger $b'$, owing to its shape, holds the thread $t'$ at the right-hand side of the lowermost needle, viewing Fig. 3 at some little distance away from the lowermost needle. Now, with the parts in the position last above referred to, the shafts $A^7$ in their rotation cause the cams $A^8$, acting on the rolls of the radius-bars $A^9$, to quickly lift the levers $A^{17}$. As the levers $A^{17}$ start to rise, the plates 31 32, pivoted upon arms 33 34, firmly bolted to the levers $A^{17}$, rise and act upon the studs 18 19 of the levers carrying the fingers $b\ b'$, respectively. The cam-plates 31 32, acting upon the studs 18 19, quickly turn the two fingers $b\ b'$ upon their fulcra, causing the upper ends of the said fingers to be moved quickly away from the needles, thus distending or drawing out the threads $t'\ t$ into loops of sufficient size for the ready entrance of the loop-drawing hooks $a$, carried by the upper ends of the levers $A^{17}$, the fingers $b\ b'$ being moved quickly to prepare loops in the heddle-threads for the entrance of the hooks $a$.

Figs. 14 to 21 show one needle with parts co-operating with it, the said figures being made as diagrams, in order to graphically explain the construction of the eye portion of the heddle to be made upon the machine.

Figure 14:
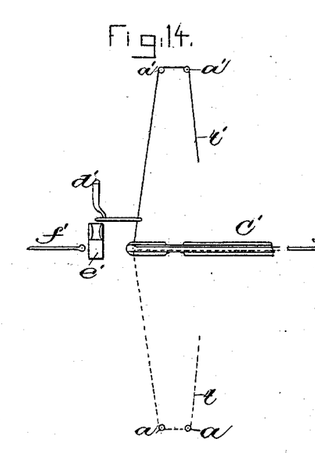
Figs. 14 to 19, inclusive, show a needle, a thread-twister, an eye-former, and an eye-discharger, and different successive positions occupied by them in the manufacture of a heddle-eye.
Figures 15, 16:
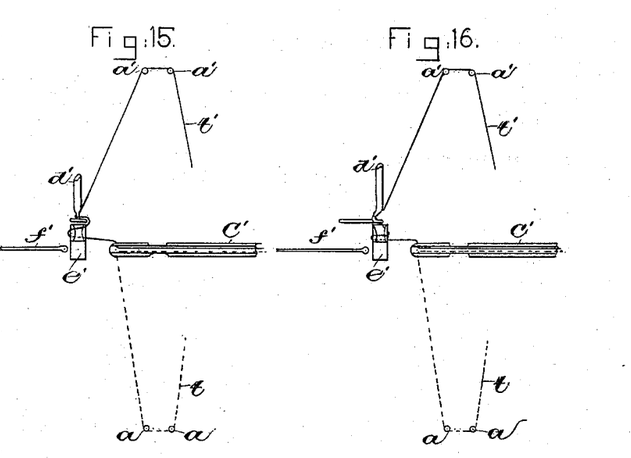
Figure 17:
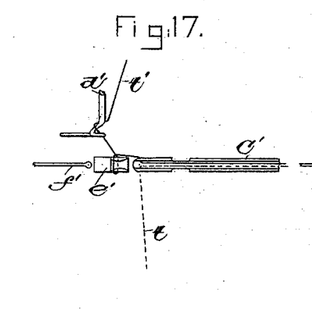
Figures 18, 19:
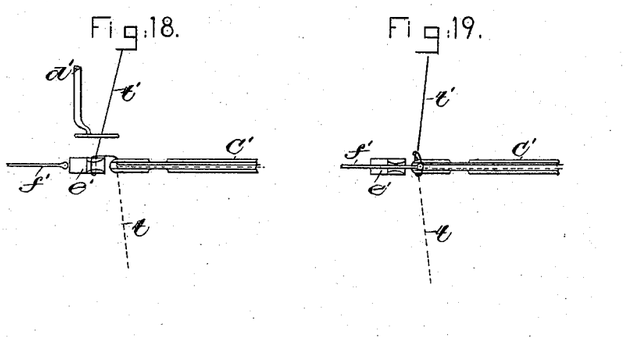
Figure 20:
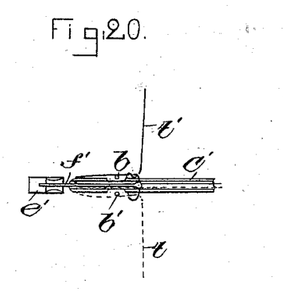
Figs. 20 and 21 show the same parts together with the loop-drawing hooks and loop-taking fingers in position, as will be described.
Figure 21:
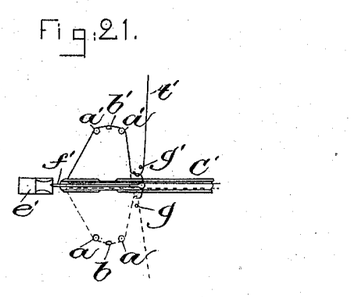

Referring to Fig. 14, the thread-twister is in position to engage one of the heddle-threads. Fig. 15 shows the thread-twister moved sufficiently to wrap the heddle-thread partially about the eye-former. Fig. 16 shows the thread-twister turned yet farther, so as to bring the heddle-thread underneath the eye-former. This done, the eye-former is given a rotation for about ninety degrees, bringing the parts into the position shown in Fig. 17, and immediately thereafter the motion of the twister is reversed to unwind itself from the heddle-thread, as in Fig. 18, when the eye-discharger is pushed forward, as in Fig. 19, removing the loop or eye from the eye-former and depositing it upon the end of the needle, the movement of the loop-discharger being continued until the loop is pushed back of the notches cut in the sides of the needle, in which position the loop-taking fingers $b\ b'$ rise at opposite sides of the needle, entering the said notches, and also the loops of heddle-thread between the eyes of the needles and the loop just passed back upon the point of the needle by the dischargers, Fig. 20 showing the said loop-taking fingers in position. After this the loop-taking fingers are moved away from the needle and the loop-taking hooks $a\ a$ enter the loops of heddle-thread, as shown in Fig. 21, and carry them out and deposit them upon the loop-holding hooks $b^2$. (Fully shown in Fig. 11.)

From the foregoing description it will be seen that my improved machine differs from the machines described in the patents referred to chiefly in the relative location of the needles, which latter, instead of being one directly over the other, to thus enable the heddle-eyes to be made at equal distances between the head-bands, are located one at one side of and above the other, thus enabling the eyes of one half the heddles to be nearer, say, the right-hand head-band, than are the eyes of the remaining half of the heddles; and to enable the needles to be used in this new position I have offset one of the eye-formers, so that each needle has an eye-former directly in line with it, and I have also changed in corresponding manner the positions of the loop-dischargers.

I do intend to limit my invention to the use only of thread, for I might use fine wire for the heddles.

I do not desire to limit my invention to the exact construction of the means employed in operating the eye-formers or loop-dischargers, for instead I might employ any other equivalent or well-known mechanism.

I claim—

1. In a machine for the manufacture of heddles, two parallel needles, C C', to contain the thread from which the heddles are to be made, the said needles being located in different horizontal and also in different vertical planes, and the two eye-formers, one of which is offset, as described, combined with two thread-twisters of different lengths, means, substantially as described, to operate the eye-formers and thread-twisters, whereby the threads are wrapped about the eye-formers and the latter are moved into position at the ends of the said needles, and eye-discharging devices co-operating with the said eye-formers, substantially as and for the purpose set forth.

2. In a machine for the manufacture of heddles, two parallel needles to contain the threads from which the heddles are to be made and to receive upon them the eyes of the heddles, the said needles being located in different horizontal and vertical planes, two thread-twisters one of which is longer than the other, two-eye-formers one of which is offset with relation to the other, two sets of loop-dischargers located in different vertical and horizontal planes, and means, substantially as described, to operate the said needles, loop-twisters, eye-formers, and loop-dischargers, substantially as set forth.

In testimony whereof I have signed my name to this specification in the presence of two subscribing witnesses.

THOMAS A. EMMONS.

Witnesses:
G. W. GREGORY,
C. M. CONE.